United States Patent Office 2,951,684
Patented Sept. 6, 1960

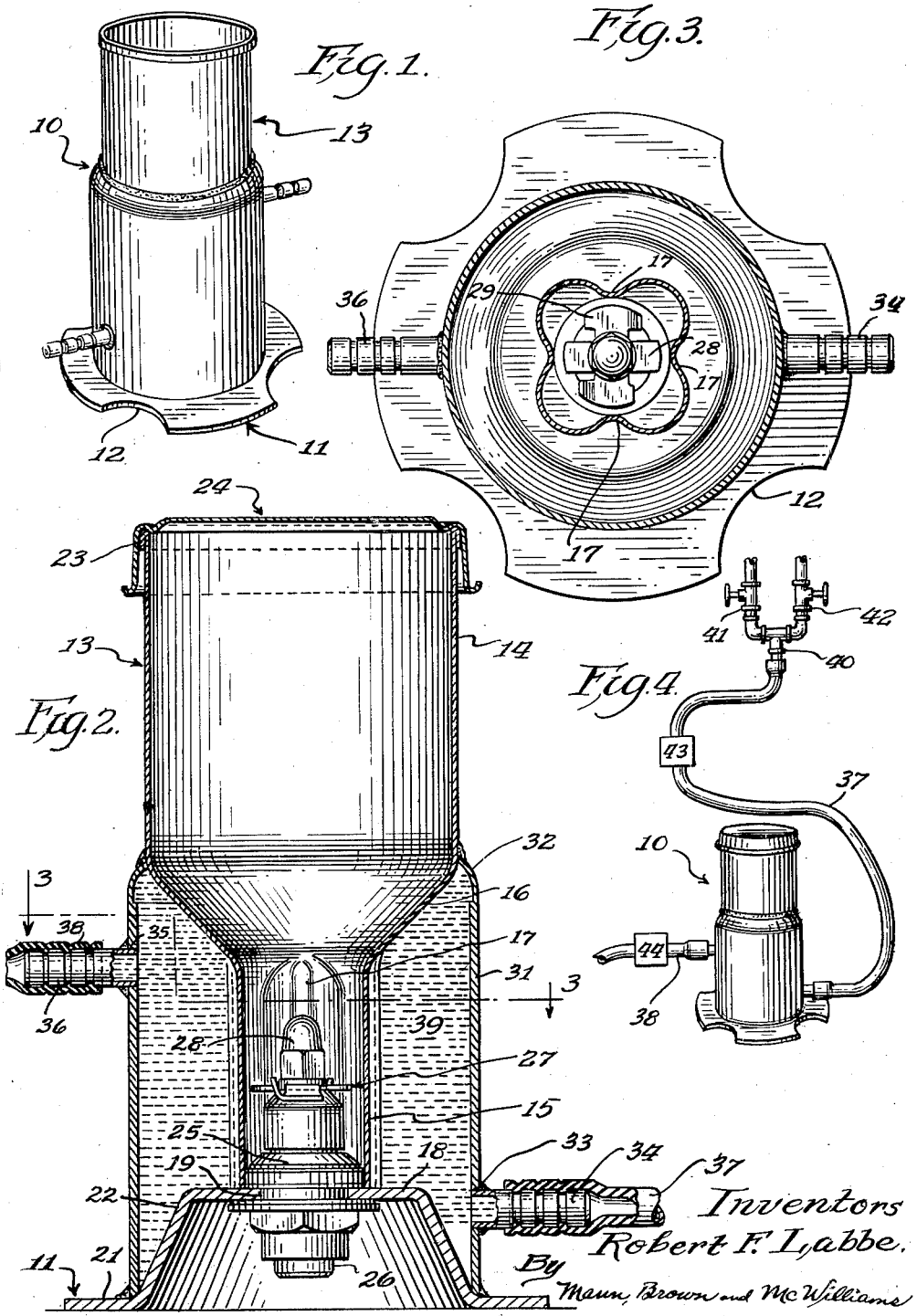

2,951,684

BLENDER

Robert F. Labbe, Portland, Oreg., assignor to Central Scientific Co., a corporation of Illinois Filed Oct. 8, 1956, Ser. No. 614,439

1 Claim. (Cl. 257—108)

This invention relates to a blender container with a liquid temperature control which is used primarily for mixing and disintegrating small volumes of biological and chemical specimens at a constant temperature, and the method of making said blender.

Research laboratories doing work in the fields of chemistry and biology often use only small quantities of material in conducting their experiments. For many reasons they find the need to mix or disintegrate their specimens at a constant temperature. For example, in the case of bacteria, the cultures may be quite delicate and live only at a given temperature. In the chemical laboratories, certain chemical compounds or mixtures have a critical temperature in that an unwanted reaction may take place if the compound or mixture is heated.

It has been found that the mixing or disintegration of a small quantity of material often causes a temperature rise in the material. The friction between a stirring element and the stirred material creates heat which in turn causes the temperature rise. An increase in temperature is undesirable in some instances for reasons given above.

The objects of the instant invention are directed to a device that may be used to mix or disintegrate small quantities of solutions, emulsions, or suspensions at a constant temperature and a method for making said device by attaching a container to a base, fixing a mixing element to the base within the container, and attaching a liquid container sleeve to the container and base so that the portion of the container adjacent the mixing element may be temperature controlled. The objects are further directed to a method of maintaining a constant temperature of the material being mixed or disintegrated by removing the heat generated by the mixing or disintegrating actions with a fluid passing through a chamber surrounding the chamber in which said material is contained.

The means by which the foregoing and other objects are accomplished and the method of their accomplishment will readily be understood from the following specification upon reference to the accompanying drawings in which:

Figure 1 is a perspective view of a liquid temperature controlled blender of the type sold under the tradename Waring Blendor;

Figure 2 is a cross sectional view of the blender shown in Figure 1 with tubes attached to inlet and outlet spouts;

Figure 3 is a cross sectional view taken on line 3—3 of Figure 2; and

Figure 4 is a perspective view of the blender shown in Figure 1 but attached to liquid conducting tubing.

A base 11 of the blender container structure 10 shown in Figure 1 has four cut out mounting indentations 12 in the base so that the blender container may be mounted on a conventional complementarily formed support (not shown) provided with a source of rotating energy such as a splined shaft from an electric motor which is likewise not shown.

The container itself, generally indicated by the numeral 13, is secured to the base 11. The container 13 consists of an upper cylinder 14 and a lobular stirring chamber 15 at the lower end thereof. The chamber 15 is smaller in diameter than the upper cylinder 14; therefore, a neck portion 16 joins the upper cylinder to the stirring chamber. The stirring chamber 15 has lobes 17 in the wall thereof to improve the stirring and disintegrating action therein. The free end of cylinder 14 contains a rolled edge 23 which acts as an engaging surface for cover 24.

The base 11 has an annular center portion 18 which contains a mounting orifice 19 in the center thereof. The outer periphery or rim of base 11 consists of an annular supporting surface 21 which contains the above mentioned indentations 12. Joining the mounting surface 18 and the supporting surface 21 is a conical portion 22.

Mounted on the base 11 in mounting orifice 19 is a mounting assembly generally indicated by numeral 25. Within the mounting assembly 25 is a drive shaft 26. Non-rotatably mounted on the drive shaft 26 is a stirring element 27 and a retaining nut 28 secures the stirring element 27 to drive shaft 26.

The stirring element 27 consists of two pairs of blades, a pair of blades 28 as shown in Figures 2 and 3 is flat, while the other pair of blades 29 are curved. Thus, the stirring element may disintegrate as well as mix should there be any large particles in a fluid which is being mixed.

A cylindrical tubular wall 31 having a reduced portion 32 at one end thereof is fixed to container 13 at the reduced portion 32. The opposite end of cylinder 31 is fixed to base 11 thus forming a liquid container sleeve 39 around chamber 15. On one side of tubular wall 31 proximate the base 11 is an inlet orifice 33. Secured within the orifice 33 is an inlet spout 34 adapted to hold a rubber hose or tubing thereon. On the opposite side of tubular wall 31 proximate the upper portion thereof is an outlet orifice 35. Secured within the orifice 35 is an outlet spout 36 which is adapted to hold a rubber hose or tubing.

The base 11 is Monel metal sheet which is formed by stamping; the indentations 12 and orifice 19 are formed during the stamping operation. The mounting assembly is also made of Monel metal so that the assembly will not react chemically with any materials with which it may happen to contact in the stirring operation.

The container 13 is formed from a Monel tube which has lobes 17 stamped in one end. The tube is then spun to form the upper cylinder 14 and neck portion 16 connecting the cylinder with the stirring chamber 15. The formed container 13 is secured to the stamped base 11 by brazing so that a fluid tight joint is made between said parts. The stirring assembly is then mounted in the orifice 19 within container 13.

The cylindrical tubular wall 31 is a stainless steel tube with one end thereof turned in order to remove some of the metal therein to form the reduced portion 32. After the portion 32 is turned, a hole is drilled on one side of the tube near the portion 32 to form orifice 35. A second hole is drilled on the opposite side of tube 31 near the end opposite portion 32 to form orifice 33. The tube 31 is telescopically fitted over the cylindrical portion 14 of container 13 and rests upon base 11. While the tube is engaging base 11, portion 32 is then rolled so that the end of portion 32 engages container 13.

A seam between container 13 and tube 31 is then brazed to form a fluid tight seal between the two parts and tube 31 is also brazed to base 11 to form a fluid tight seal therebetween.

A nipple 34 is inserted in orifice 33 and the parts are then brazed forming a fluid tight seam. A second nipple 36 is placed in orifice 35 and the parts are also brazed forming a fluid tight seal therebetween.

In order to conduct a liquid to the stirring chamber 15, rubber tubing 37 is fixed onto nipple 34. A second piece of rubber tubing 38 is fixed onto nipple 36. The tubing 37 is connected to a source of liquid at the desired temperature while rubber tubing 38 is connected to a suitable place for disposal of the liquid leaving spout 36.

The above-mentioned liquid enters liquid chamber 39 through orifice 33 and leaves the chamber 39 through the outlet orifice 35 through nipple 36 and thence to tubing 38 which conducts the liquid to a suitable place of disposal.

For purposes of illustration, Figure 4 shows an arrangement for controlling the temperature in blender container structure 10. The tubing 37 is connected to a nozzle 40 which is common to valves 41 and 42. Valves 41 and 42 are connected to sources of hot and cold water respectively, so that the amounts of hot and cold water may be proportioned to the nozzle 40. As the water flows through tubing 37, a thermocouple 43 indicates the temperature of the water and thus the water temperature may be adjusted before the water enters chamber 39. As the water leaves chamber 39 through tubing 38, a second thermocouple 44 indicates the temperature of the outgoing water. Should the temperature of the outgoing water deviate greatly from the desired temperature, the rate of flow may be increased or the temperature of the incoming water may be changed.

After the temperature controlled liquid has been allowed to circulate through the chamber 39, the blender stirring assembly is actuated by a suitable source of rotating energy, such as that previously mentioned, through drive shaft 26. Materials to be mixed or disintegrated are then introduced into container 13. The source of rotating energy rotates stirring element 27 to stir and disintegrate the materials.

Since the stirring chamber 15 is quite small, a small amount of material may be stirred therein. However, the cylinder 14 is quite large in comparison to stirring chamber 15 so that if a large amount of material is to be stirred the cylinder 14 may be filled. When cylinder 14 contains a portion of the materials to be stirred, the materials will be drawn along lobes 17 to the stirring element by the vortex created by the rotation of said element.

As the material is stirred, the temperature is controlled by the liquid within chamber 39. Since all of the material within cylinder 14 is drawn to the rotating stirring element, all of the material within container 13 is temperature controlled by the liquid in chamber 39 although the chamber 39 does not extend along the entire length of container 13.

The temperature controlling of only stirring chamber 15 has a very distinct advantage when materials that are being stirred are to be kept at a low temperature since the liquid coolant may be used to absorb any heat generated by the stirring element without over cooling the material in cylinder 14.

While I have shown and described particular embodiments of my invention, it will occur to those skilled in the art that variations, changes and modifications may be made without departing from my invention and I therefore aim in the appended claim to cover all such changes and modifications as fall within the true spirit and scope of my invention.

I claim:

A blender having a liquid temperature controlled stirring chamber, said blender comprising an upright container having an upper cylindrical portion, and a lower portion of reduced dimension transversely of the axis of said upper portion and lobular in transverse cross-sectional configuration, said lower portion defining the stirring chamber of the blender, an inverted dish-like base portion formed with an upper annular central portion and a lower laterally extending container supporting rim, the lower end of said container lower portion being fixed to said central portion of said base portion, a drive shaft journalled in said central portion of said base portion, said drive shaft extending into said container lower portion and carrying an impeller, a generally cylindrical sleeve positioned about said container lower portion and concentrically disposed with respect to said axis of said container, said sleeve having its upper end disposed against said container adjacent the lower end of said cylindrical portion, and having its lower end bearing against said base portion and disposed about said center portion thereof, means for forming a liquid tight joint between said sleeve, said container and said base portion, said sleeve and said means forming annular liquid receiving chamber means for immersing said lower portion of said container in a liquid, inlet and outlet conduit means carried by said sleeve and communicating directly with said chamber means, and means associated with said inlet conduit means for indicating the temperature of the liquid entering said chamber means.

References Cited in the file of this patent
UNITED STATES PATENTS

| | | |
|---|---|---|
| 1,293,087 | Grosvenor | Feb. 4, 1919 |
| 2,109,501 | Osius | Mar. 1, 1938 |
| 2,217,090 | Zerbe | Oct. 8, 1940 |
| 2,284,155 | Landgraf | May 26, 1942 |
| 2,401,606 | Brown | June 4, 1946 |
| 2,472,362 | Barnebey et al. | June 7, 1949 |
| 2,794,627 | Rodwick | June 4, 1957 |

FOREIGN PATENTS

| | | |
|---|---|---|
| 105,637 | Germany | Sept. 15, 1899 |
| 344,503 | Italy | Nov. 10, 1936 |